(12) United States Patent
Dominguez Cuevas et al.

(10) Patent No.: US 11,077,742 B2
(45) Date of Patent: Aug. 3, 2021

(54) ADJUSTABLE LOCATOR FOR INTERIOR TRIM PANEL OF VEHICLE

(71) Applicant: GM Global Technology Operations LLC, Detroit, MI (US)

(72) Inventors: Jesus Edgar Dominguez Cuevas, Jiutepec (MX); Jose Elias Ruede Gomez, Toluca (MX); Alejandro Barrera Torres, Metepec (MX); Ricardo Jesus Almazan Celis, Almoloya de Juarez (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/559,146

(22) Filed: Sep. 3, 2019

(65) Prior Publication Data
US 2021/0061073 A1  Mar. 4, 2021

(51) Int. Cl.
*B60J 5/04* (2006.01)
*B62D 65/14* (2006.01)
*B60R 13/02* (2006.01)

(52) U.S. Cl.
CPC ......... *B60J 5/0469* (2013.01); *B60R 13/0243* (2013.01); *B62D 65/14* (2013.01)

(58) Field of Classification Search
CPC ....... B60J 5/0469; B60R 13/0243; B62D 5/14
See application file for complete search history.

(56) References Cited

U.S. PATENT DOCUMENTS

| | | | | |
|---|---|---|---|---|
| 6,122,809 A | * | 9/2000 | Roy | B25B 27/026 29/239 |
| 6,122,819 A | * | 9/2000 | Roy | B23P 19/10 29/281.1 |
| 9,010,841 B1 | * | 4/2015 | Kwolek | B60R 13/0243 296/146.7 |
| 9,409,531 B1 | * | 8/2016 | Bailo | B60R 13/02 |
| 9,914,406 B1 | * | 3/2018 | Hemker | B60R 13/0243 |
| 2004/0216319 A1 | * | 11/2004 | Muchnik | B25H 7/045 33/666 |
| 2008/0000069 A1 | * | 1/2008 | Savoy | B62D 65/02 29/430 |
| 2010/0051567 A1 | * | 3/2010 | Ross, Jr. | B60K 15/07 211/85.18 |
| 2018/0086255 A1 | * | 3/2018 | Salter | B60R 13/0243 |
| 2019/0250592 A1 | * | 8/2019 | Sadri | G05B 19/401 |
| 2020/0079297 A1 | * | 3/2020 | Dominguez Cuevas | B60R 13/0206 |

\* cited by examiner

*Primary Examiner* — Lori L Lyjak (57) ABSTRACT

A locator assembly for an interior trim panel of a vehicle comprises a bracket and an adjustable locator. The bracket is disposed in the interior trim panel. The adjustable locator comprises a locator pin and is rotatably supported by the bracket. The adjustable locator is capable of rotating from a first position to a second position. The locator pin is disposed in a first location when the adjustable locator is in the first position. The locator pin is disposed in a second location when the adjustable locator is in the second position. The first location of the locator pin is displaced a first distance in a first direction from the second location of the locator pin.

20 Claims, 7 Drawing Sheets

ADJUSTABLE LOCATOR FOR INTERIOR TRIM PANEL OF VEHICLE

INTRODUCTION

The present disclosure relates generally an interior trim panel of a vehicle and more particularly to an interior door trim panel locating mechanism for a vehicle.

Interior vehicle designs are constantly improving the experience of driving and riding in the vehicle. Interior trim panels include designs the features that collaborate with adjacent trim panels. Thus the designs and features of one trim panel needs to be properly aligned with the same designs and features of adjacent trim panels or instrument panels. This is accomplished through properly locating the interior trim panels to the structure that the trim panels are supported by. However, properly locating the trim panels to the respective door structure, for example, requires tight dimensional control of many parts that make the door assembly.

Accordingly, there is a need for new interior trim panel locating mechanism that is simpler to use and provides for exact alignment of interior panels.

SUMMARY

A locator assembly for an interior trim panel of a vehicle is provided. The locator assembly comprises a bracket and an adjustable locator. The bracket is disposed in the interior trim panel. The adjustable locator comprises a locator pin and is rotatably supported by the bracket. The adjustable locator is capable of rotating from a first positon to a second position. The locator pin is disposed in a first location when the adjustable locator is in the first position. The locator pin is disposed in a second location when the adjustable locator is in the second position. The first location of the locator pin is displaced a first distance in a first direction from the second location of the locator pin.

In one example of the present disclosure, the bracket comprises a first surface, a second surface, a first track, a second track, a locator access portion, and a locator groove. The second surface is opposite the first surface. The first track is disposed on the first surface. The second track is disposed on the second surface. The adjustable locator is disposed in the locator groove.

In another example of the present disclosure, the adjustable locator comprises a first disc, and a second disc. The first disc is coaxially disposed on a base of the locator pin. The second disc is coaxially disposed on the locator pin approximately a second distance from the first disc. The first disc and the second disc straddle the bracket.

In yet another example of the present disclosure, the adjustable locator further comprises a first tooth and a second tooth. The first tooth is disposed on a third surface of the first disc of the adjustable locator. The second tooth is disposed on a fourth surface of the second disc of the adjustable locator. The adjustable locator is further disposed in the bracket such that the first tooth is disposed in the first track of the bracket and the second tooth is disposed in the second track of the bracket.

In yet another example of the present disclosure, each of the first track and the second track include a first rail, a second rail, and a series of ridges. The second rail is disposed opposite the first rail and the series of ridges are disposed connecting the first rail to the second rail.

In yet another example of the present disclosure, the locator pin of the adjustable locator further comprises a co-axial bore formed by at least one interior surface.

In yet another example of the present disclosure, the bore of the locator pin has a hexagonal cross-section.

In yet another example of the present disclosure, the adjustable locator further comprises a tab extending from the outer periphery of the first disc approximately opposite the first tooth.

In yet another example of the present disclosure, the bracket further comprises a first stop and a second stop. The first stop is disposed on the first surface of the bracket proximate a first end of the first track. The second stop is disposed on the first surface of the bracket proximate a second end of the first track.

In yet another example of the present disclosure, when the adjustable locator is rotated to the first position the tab is disposed in contact with the first stop of the bracket. When the adjustable locator is rotated to the second position the tab is disposed in contact with the second stop. The first distance is about 5 mm and the first direction is a vertical direction.

Another locator assembly for an interior trim panel of a vehicle is provided. The locator assembly comprises a bracket and an adjustable locator. The bracket is disposed in the interior trim panel. The bracket comprising a first surface, a second surface, a first track, a second track, a locator access portion, and a locator groove. The second surface is opposite the first surface. The first track is disposed on the first surface. The second track is disposed on the second surface.

The adjustable locator comprises a locator pin, a first disc, a second disc, a first tooth, and a second tooth. The first disc is coaxially disposed on a base of the locator pin. The second disc is coaxially disposed on the locator pin approximately a second distance from the first disc. The first disc and the second discs straddle the bracket. The first tooth is disposed on a third surface of the first disc of the adjustable locator. The second tooth is disposed on a fourth surface of the second disc of the adjustable locator. The adjustable locator is disposed in the locator groove of the bracket such that the first tooth is disposed in the first track of the bracket and the second tooth is disposed in the second track of the bracket.

The adjustable locator is capable of rotating from a first positon to a second position. The locator pin is disposed in a first location when the adjustable locator is in the first position. The locator pin is disposed in a second location when the adjustable locator is in the second position. The first location of the locator pin is displaced a first distance in a first direction from the second location of the locator pin.

In one example of the present disclosures, each of the first track and the second track include a first rail, a second rail, and a series of ridges. The second rail is disposed opposite the first rail and the series of ridges are disposed connecting the first rail to the second rail.

In another example of the present disclosure, the locator pin of the adjustable locator further comprises a co-axial bore formed by at least one interior surface.

In yet another example of the present disclosure, the bore of the locator pin has a hexagonal cross-section.

In yet another example of the present disclosure, the adjustable locator further comprises a tab extending from the outer periphery of the first disc approximately opposite the first tooth.

In yet another example of the present disclosure, the bracket further comprises a first stop and a second stop. The first stop is disposed on the first surface of the bracket proximate a first end of the first track. The second stop is disposed on the first surface of the bracket proximate a second end of the first track.

In yet another example of the present disclosure, when the adjustable locator is rotated to the first position the tab is disposed in contact with the first stop of the bracket. When the adjustable locator is rotated to the second position the tab is disposed in contact with the second stop. The first distance is about 5 mm and the first direction is a vertical direction.

A method of assembling a first interior trim panel assembly to a door of a vehicle is provided. The method comprises proving a first interior trim panel assembly including a first locator assembly and a male clip, hanging the first interior trim panel assembly on the door at a top edge of the first interior trim panel assembly, swinging the first interior trim panel assembly onto the door forcing the male clip to engage with the female clip located on the door, and adjusting the first locator assembly of the interior trim panel assembly.

In one example of the present disclosure, the method further comprises visually checking the first interior trim panel assembly alignment with an adjacent second interior trim panel.

In another example of the present disclosure, the method further comprises installing additional trim parts on the first interior trim panel assembly to cover the first locator assembly.

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

DESCRIPTION

The following description is merely exemplary in nature and is not intended to limit the present disclosure, application, or uses. The terms "about", "approximately", and "proximate" as used in the description is defined as an amount or location around a specific number or closer to an element that does not have a significant impact on the results or the operation of an element.

Figure 2:
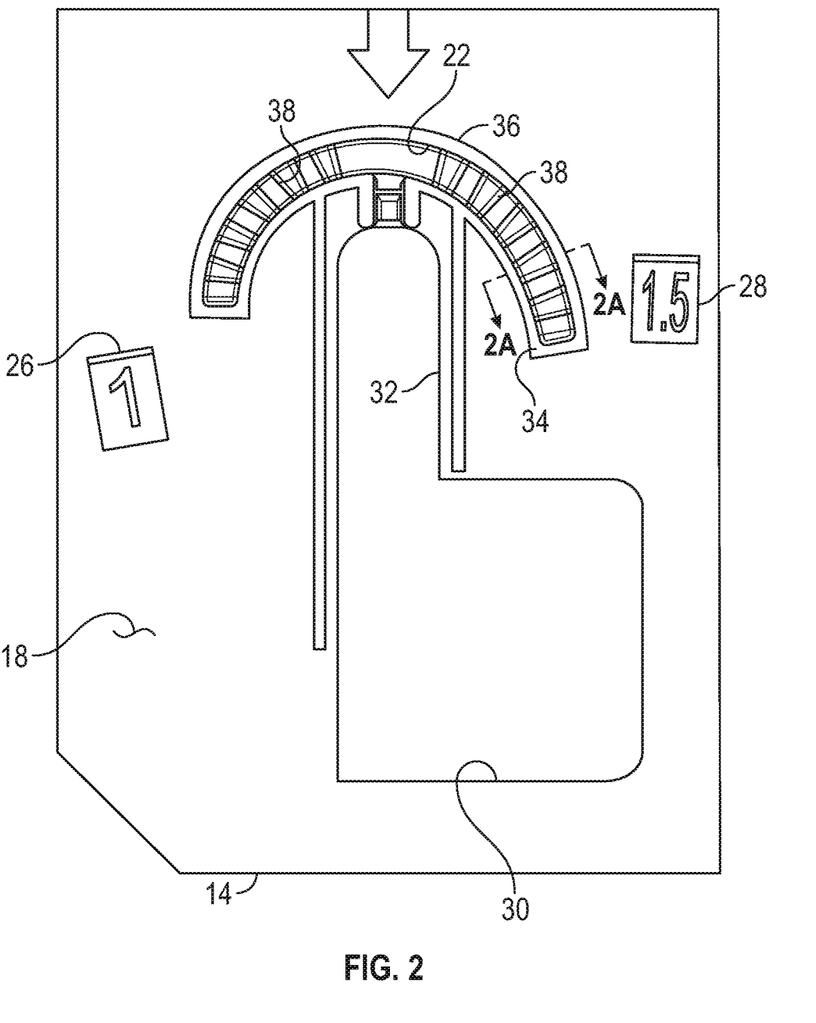
FIG. 2 is a plan view of a portion of a trim panel locating assembly according to the principles of the present disclosure.
Figure 2A:
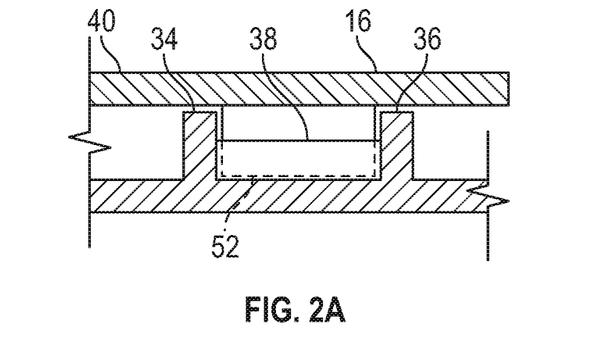
FIG. 2A is a cross-section of a portion of a trim panel locating assembly according to the principles of the present disclosure.
Figure 3:
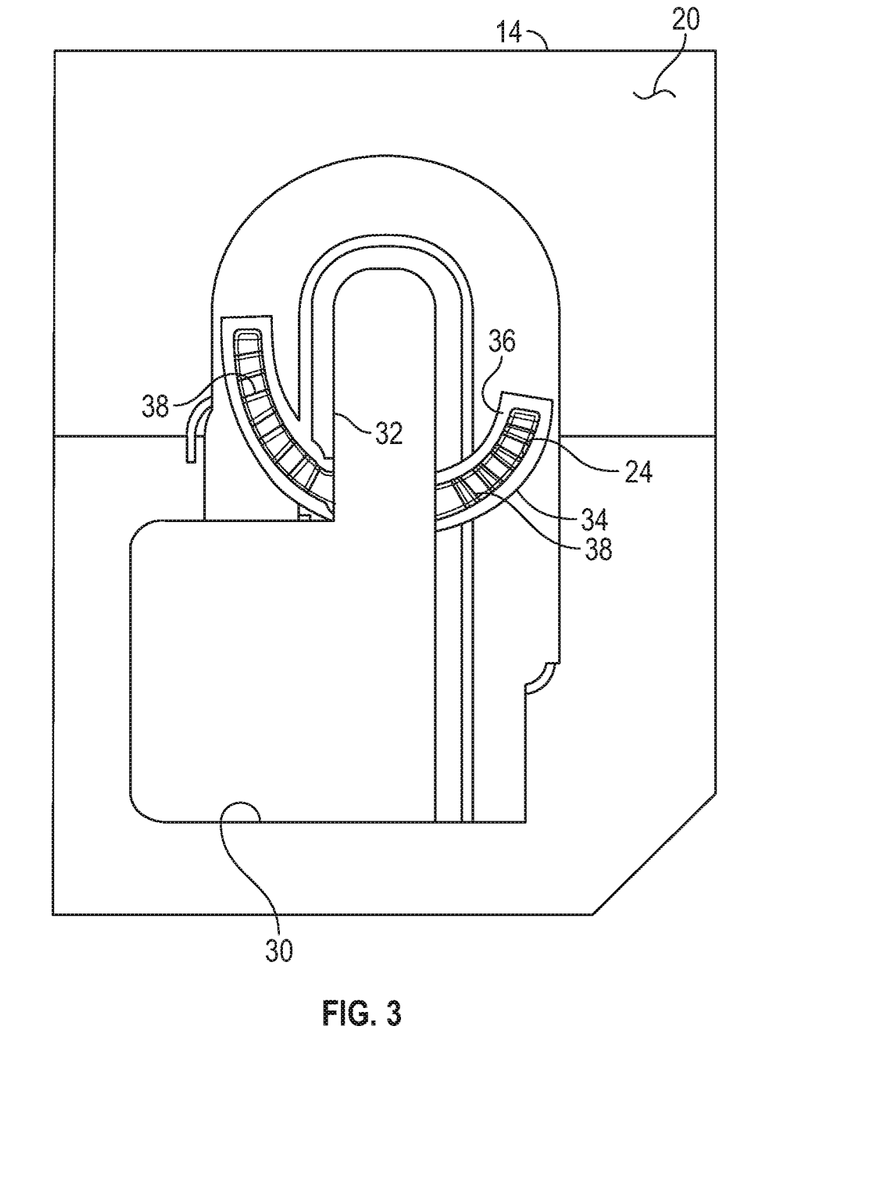
FIG. 3 is a plan view of a portion of a trim panel locating assembly according to the principles of the present disclosure.

With reference to FIGS. 1-5 a locator assembly 10 for an interior trim panel of a vehicle is illustrated and will now be described. The locator assembly 10 in the present disclosure is used for the installation of an interior trim panel assembly 12 (shown in FIG. 6) of a vehicle. The locator assembly 10 includes a bracket 14 and an adjustable locator 16. More particularly, the bracket 14 is shown isolated in FIGS. 2 and 3 and includes a first surface 18, a second surface 20, a first track 22, a second track 24, a first stop 26, a second stop 28, a locator access portion 30, and a locator groove 32. The first track 22 is disposed on the first surface 18 of the bracket 14. The second track 24 is disposed on the second surface 20 of the bracket 14. A cross-section shown in FIG. 2A illustrates the profile of the first track 22 which happens to be identical to the profile of the second track 24. The first track 22 and second track 24 include a first rail 34, a second rail 36 opposite the first rail 34, and a series of ridges 38 connecting the first rail 34 with the second rail 36. The first and second rails 34, 36, while being on opposite surfaces, coordinate to retain the adjustable locator 16 in a particular position relative to the bracket 14 as will be explained in further detail below.

Figure 4:
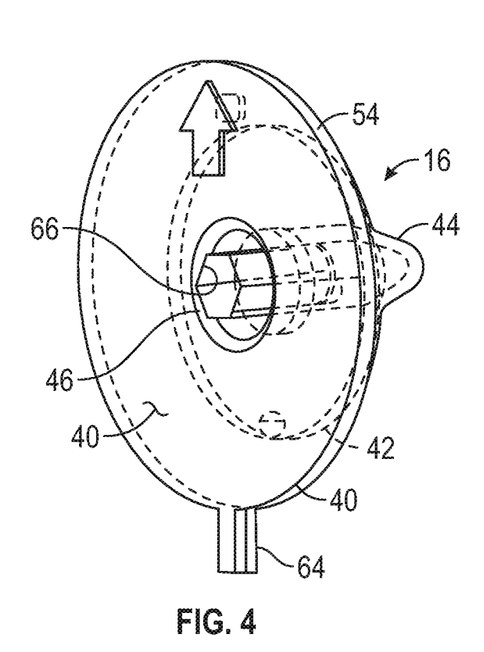
FIG. 4 is a perspective view of a portion of a trim panel locating assembly according to the principles of the present disclosure.
Figure 5:
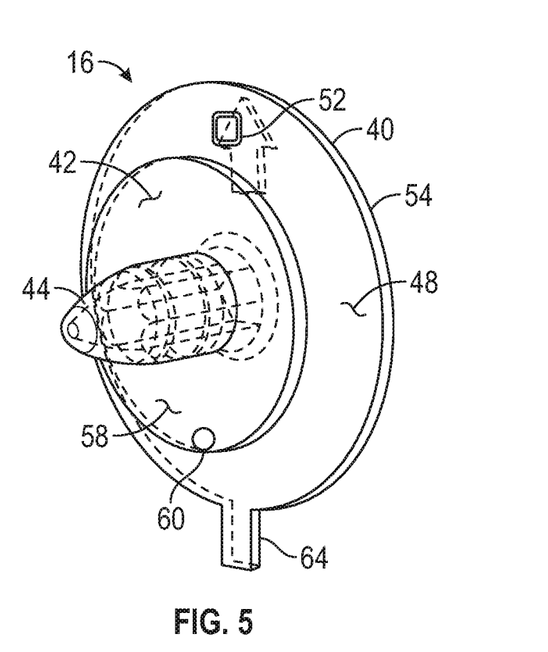
FIG. 5 is a perspective view of a portion of a trim panel locating assembly according to the principles of the present disclosure.
Figure 6:
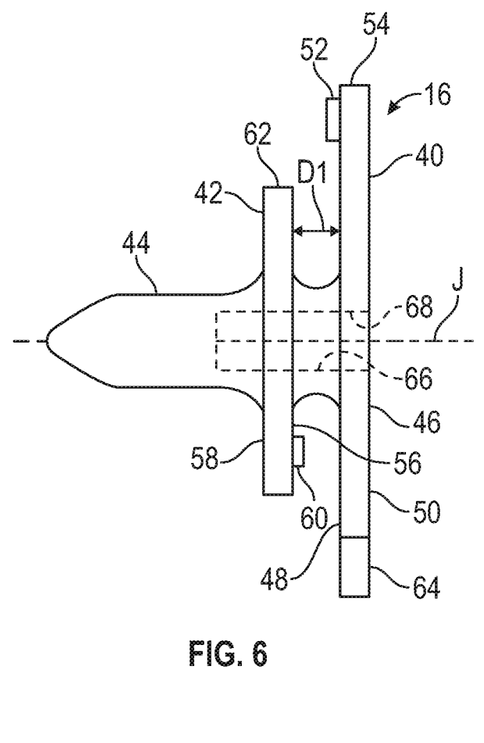
FIG. 6 is a side view of a portion of a trim panel locating assembly according to the principles of the present disclosure.

The adjustable locator 16, as shown in FIGS. 4-6, includes a first disc 40, a second disc 42, and a locator pin 44. For example, the first disc 40 is coaxially disposed at a base 46 of the locator pin 44 with the second disc 42 disposed coaxially on the locator pin 44 approximately a distance D1 from the first disc 40. The first disc 40 includes a first surface 48 and a second surface 50 opposite the first surface 48. A first tooth 52 of the first disc 40 is disposed on the first surface 48 proximate the outer edge 54 of the first disc 40. The second disc 42 includes a first surface 56 and a second surface 58 opposite the first surface 56. A second tooth 60 of the second disc 42 is disposed on the first surface 56 proximate the outer edge 62 of the second disc 42. The first tooth 52 is further disposed approximately 180° around the periphery of the adjustable locator 16 from the second tooth 60.

The adjustable locator 16 also includes a tab 64 and an axial bore 66. The tab 64 is disposed extending from the outer edge 54 of the first disc 40 opposite from the first tooth 52. The axial bore 66 is formed by interior surfaces 68 formed in the locator pin 44. The axial bore 66 is coaxial with the locator pin 44 and has a non-circular cross-section capable of receiving a tool for rotating the adjustable locator 16 as will be described further below. For example, the axial bore 66 shown in FIG. 4 has a hexagonal cross-section.

Figure 1:
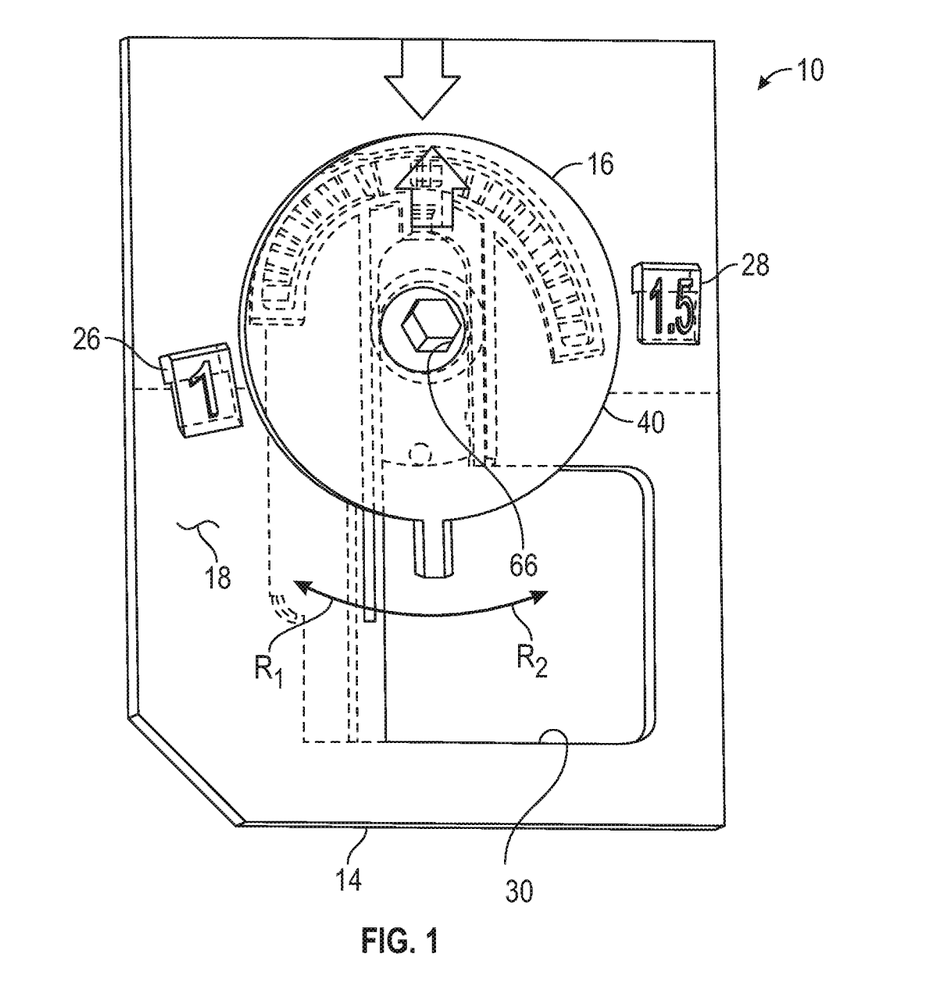
FIG. 1 is a plan view of a trim panel locating assembly according to the principles of the present disclosure.
Figure 1A:
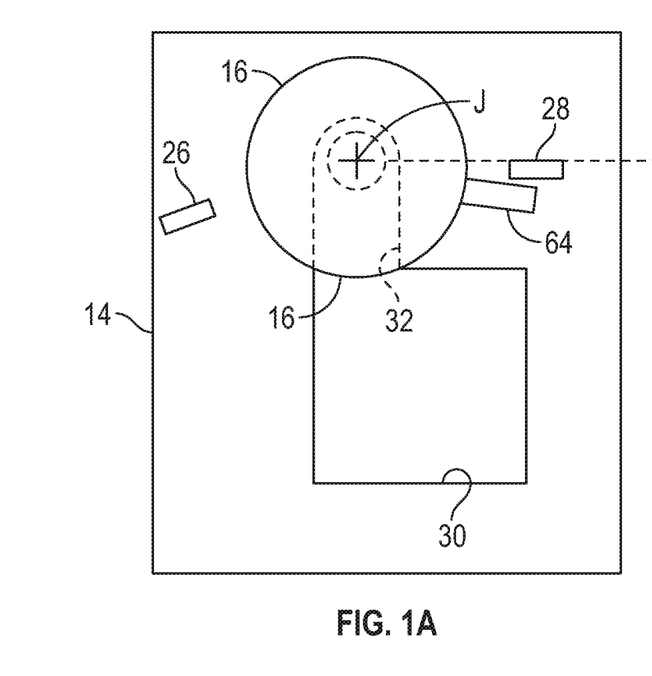
FIG. 1A is a schematic view of a trim panel locating assembly according to the principles of the present disclosure.
Figure 1B:
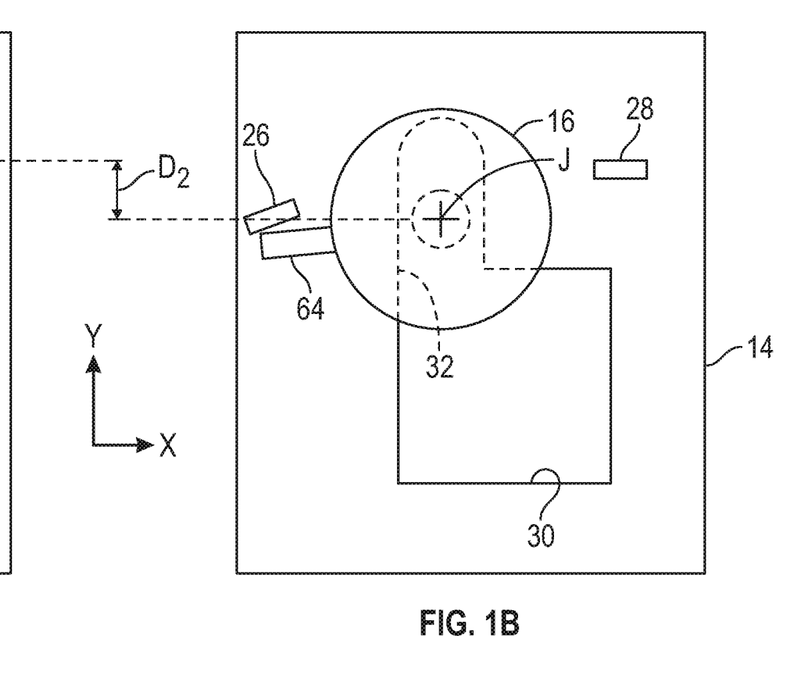
FIG. 1B is a schematic view of a trim panel locating assembly according to the principles of the present disclosure.
Figure 7:
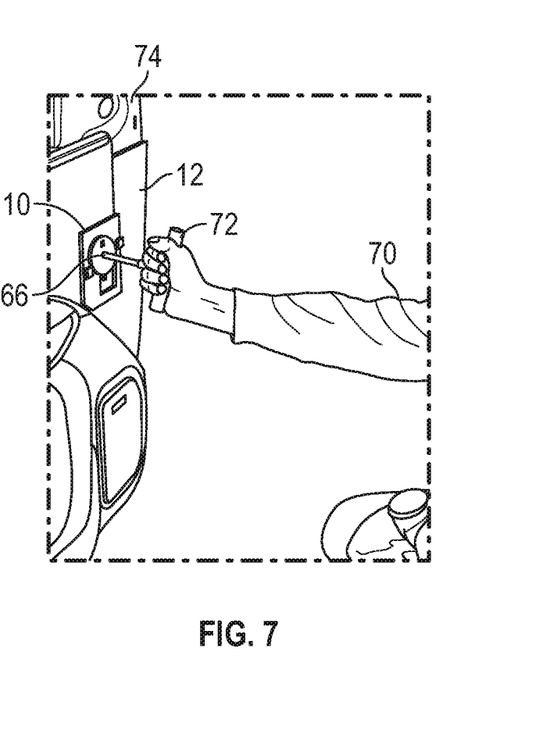
FIG. 7 is a perspective view of a portion of a trim panel locating assembly according to the principles of the present disclosure.

Returning to FIG. 1, the locator assembly 10 is shown having the adjustable locator 16 installed in the bracket 14 such that the first surface 48 of the first disc 40 is in contact with the first surface 18 of the bracket 14, the first surface 56 of the second disc 42 is in contact with the second surface 20 of the bracket 14, and the locator pin 44 is disposed in the locator groove 32 of the bracket 14. Furthermore, the first tooth 52 of the first disc 40 is disposed in the first track 22 of the bracket 14 and the second tooth 60 of the second disc 42 is selectively disposed in the second track 24 of the bracket 14. For example, when the adjustable locator 16 is rotated in a clockwise or counterclockwise direction relative to the bracket 14, the second tooth 60 enters into the second track 24 on either side of the locator groove 32. When the adjustable locator is rotated in a first rotational direction R1, the tab 64 contacts the first stop 26 to prevent further rotation in that direction. Likewise, rotation in the second rotational direction R2 is completed when the tab 64 contacts the second stop 28. As shown in FIG. 1A, the adjustable locator 16 is rotated as far as the second stop 28 allows by preventing the tab 64 from continuing so that the adjustable locator 16 is in a first position. The locator pin 44 moves in the positive Y direction when the adjustable locator rotates in the R2 direction. Referring to FIG. 1B, the adjustable locator 16 is rotated as far as the first stop 26 allows by preventing the tab 64 from continuing so that the adjustable locator 16 is in a second position. The locator pin 44 moves in the negative Y direction when the adjustable locator rotates in the R1 direction. The adjustable distance D2 is the distance between the axis J of the locator pin 44 when the adjustable locator 16 is in the first position and the axis J of the locator pin 44 when the adjustable locator 16 is in the second position. The adjustable locator 16 is capable of being rotated and disposed in an almost continuous number of positions between the first and second positions in order to most accurately locate the locator pin 44 relative to the bracket 14. For example, every 10° of rotation provides for a 0.5 mm movement in the Y direction. The total adjustment available as the adjustable distance D2 is 5 mm. However, the adjustable distance D2 may be greater than or less than 5 mm without departing from the scope of the disclosure. As shown in FIG. 7, the locator assembly 10 is shown installed on an interior trim panel assembly 12. The operator 70 inserts a tool 72 into the axial bore 66 of the adjustable locator 16 and rotates the adjustable locator 16 until the interior trim panel assembly 12 is accurately located.

Figure 8A:
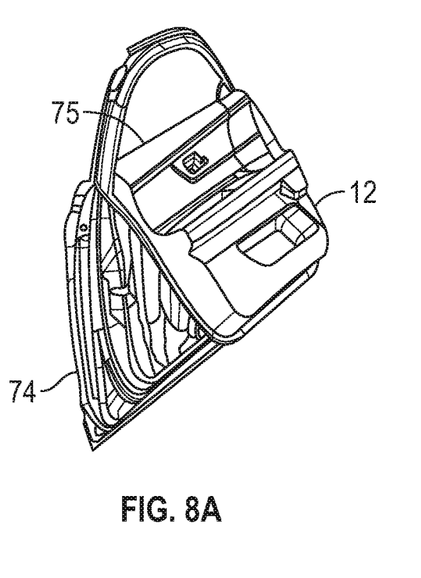
FIG. 8A is a perspective view of a partially assembled door of a vehicle according to the principles of the present disclosure.
Figure 8B:
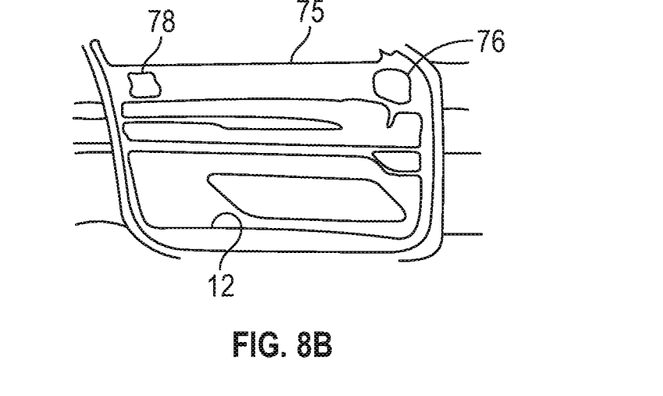
FIG. 8B is a perspective view of a partially assembled door of a vehicle according to the principles of the present disclosure.
Figure 8C:
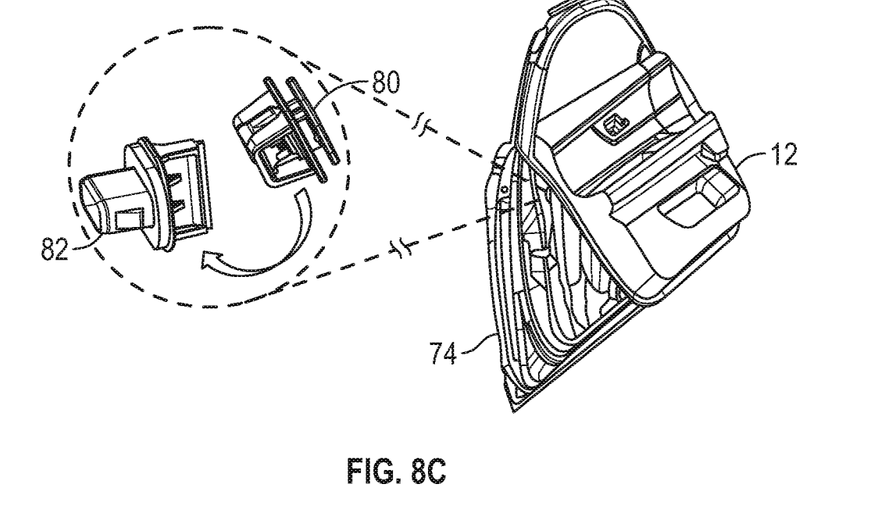
FIG. 8C is a perspective view of a partially assembled door of a vehicle according to the principles of the present disclosure.
Figure 8D:
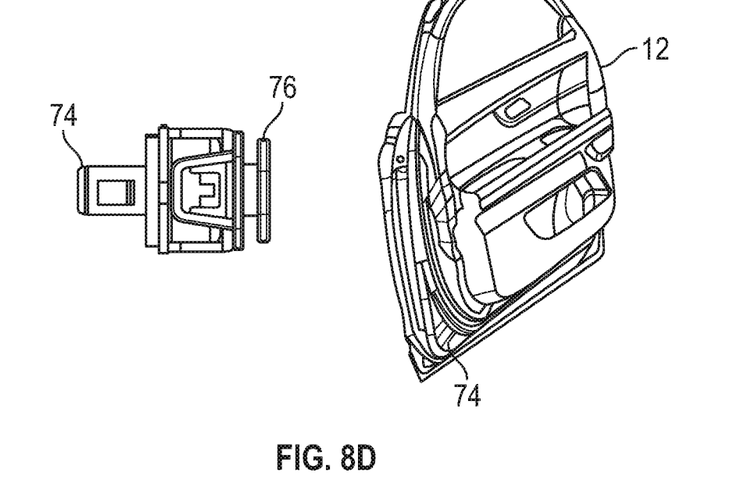
FIG. 8D is a perspective view of a partially assembled door of a vehicle according to the principles of the present disclosure.
Figure 8E:
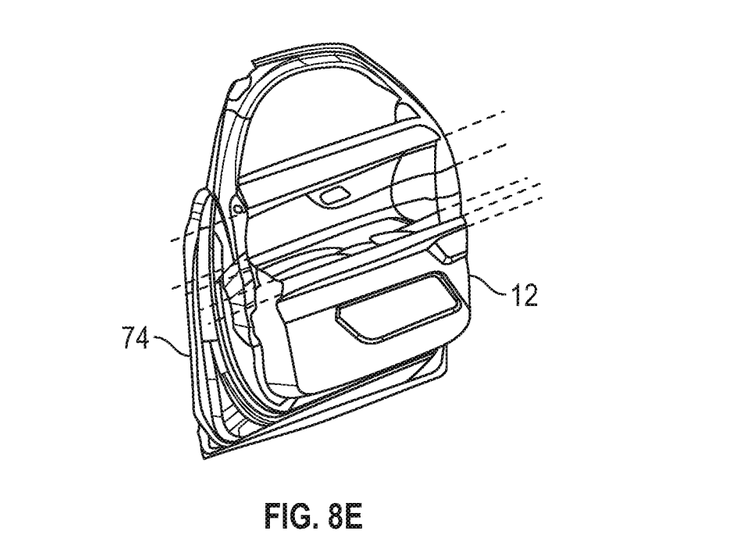
FIG. 8E is a perspective view of a partially assembled door of a vehicle according to the principles of the present disclosure.
Figure 9:
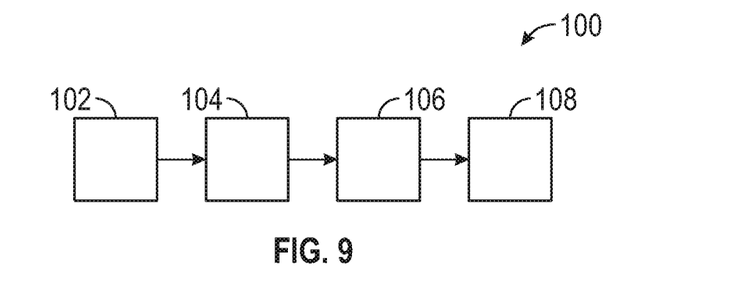
FIG. 9 is a flowchart depicting a method of assembling a interior trim panel to a door of a vehicle according to the principles of the present disclosure.

Turning now to FIGS. 8A-8E and 9, a series of images and a flowchart depict a method 100 of assembly of the interior trim panel assembly 12 onto the door 74. Projecting the quality of parts and assembly, certain features of the interior trim panel assembly 12 must align with features of adjacent interior trim panels of the instrument panel and other doors. Stitching lines, metal and wood accents, and other design features of the interior of the vehicle need to be aligned from one interior trim panel to the next. Likewise, while the present disclosure provides the example of installing an interior trim panel assembly 12 onto a door 74, other interior trim panels may be installed using the same concepts as described here. For example, an interior trim panel for the pillars, center console, quarter panel, etc. may also include the adjustable locator 16 and use the present method of installation. Thus, a first step 102 in assembling the interior trim panel assembly 12 to the door 74 includes hanging of the interior trim panel assembly 12 on the door 74 at a top edge 75 of the interior trim panel assembly 12. A first locator assembly 76 and a second locator assembly 78 are installed in the interior trim panel assembly 12 in the upper corners of the interior trim panel assembly 12 as shown in FIG. 8B. The interior trim panel assembly 12 also includes a male clip 80 to be installed with a female clip 82 that is disposed in the door 74. The male and female clips 80, 82 allow for vertical movement as shown in FIG. 8C. The second step 104 swings the interior trim panel assembly 12 onto the door 74 and forces the male clip 80 to engage with the female clip 82. The third step 106 as shown in FIG. 8D, requires an operator 70 to adjust the first and second locator assemblies 76, 78 on the interior trim panel assembly. The operator 70 visually checks the interior trim panel assembly 12 alignment with the surrounding trim panels. A fourth step 108 installs additional trim parts on the interior trim panel assembly 12 to cover the first and second locator assemblies 76, 78 as shown in FIG. 8E.

While examples have been described in detail, those familiar with the art to which this disclosure relates will recognize various alternative designs and examples for practicing the disclosed structure within the scope of the appended claims.

The following is claimed:

1. A locator assembly for an interior trim panel of a vehicle, the locator assembly comprising:
    a bracket disposed in the interior trim panel; and
    an adjustable locator comprising a locator pin, and wherein the adjustable locator is rotatably supported by the bracket; and
    wherein the adjustable locator is capable of rotating from a first position to a second position, the locator pin is disposed in a first location when the adjustable locator is in the first position, the locator pin is disposed in a second location when the adjustable locator is in the second position, and the first location of the locator pin is displaced a first distance in a first direction from the second location of the locator pin.

2. The locator assembly of claim 1 wherein the bracket comprises a first surface, a second surface, a first track, a second track, a locator access portion, and a locator groove, the second surface is opposite the first surface, the first track is disposed on the first surface, the second track is disposed on the second surface, and the adjustable locator is disposed in the locator groove.

3. The locator assembly of claim 2 wherein the adjustable locator comprises a first disc, and a second disc, the first disc is coaxially disposed on a base of the locator pin, the second disc is coaxially disposed on the locator pin approximately a second distance from the first disc, and the first disc and the second disc straddle the bracket.

4. The locator assembly of claim 3 wherein the adjustable locator further comprises a first tooth and a second tooth, the first tooth is disposed on a third surface of the first disc of the adjustable locator, the second tooth is disposed on a fourth surface of the second disc of the adjustable locator, and the adjustable locator is further disposed in the bracket such that the first tooth is disposed in the first track of the bracket and the second tooth is disposed in the second track of the bracket.

5. The locator assembly of claim 4 wherein each of the first track and the second track include a first rail, a second rail, and a series of ridges, the second rail is disposed opposite the first rail and the series of ridges are disposed connecting the first rail to the second rail.

6. The locator assembly of claim 5 wherein the locator pin of the adjustable locator further comprises a co-axial bore formed by at least one interior surface.

7. The locator assembly of claim 6 wherein the co-axial bore of the locator pin has a hexagonal cross-section.

8. The locator assembly of claim 7 wherein the adjustable locator further comprises a tab extending from an outer periphery of the first disc approximately opposite the first tooth.

9. The locator assembly of claim 8 wherein the bracket further comprises a first stop and a second stop, the first stop is disposed on the first surface of the bracket proximate a first end of the first track, the second stop is disposed on the first surface of the bracket proximate a second end of the first track.

10. The locator assembly of claim 9 wherein when the adjustable locator is rotated to the first position the tab is disposed in contact with the first stop of the bracket, when the adjustable locator is rotated to the second position the tab is disposed in contact with the second stop, the first distance is about 5 mm and the first direction is a vertical direction.

11. A locator assembly for an interior trim panel of a vehicle, the locator assembly comprising:
a bracket disposed in the interior trim panel, the bracket comprising a first surface, a second surface, a first track, a second track, a locator access portion, and a locator groove, and wherein the second surface is opposite the first surface, the first track is disposed on the first surface, and the second track is disposed on the second surface; and
an adjustable locator comprising a locator pin, a first disc, a second disc, a first tooth, and a second tooth, and wherein the first disc is coaxially disposed on a base of the locator pin, the second disc is coaxially disposed on the locator pin approximately a second distance from the first disc, the first disc and the second disc straddle the bracket, the first tooth is disposed on a third surface of the first disc of the adjustable locator, the second tooth is disposed on a fourth surface of the second disc of the adjustable locator, and the adjustable locator is disposed in the locator groove of the bracket such that the first tooth is disposed in the first track of the bracket and the second tooth is disposed in the second track of the bracket; and
wherein the adjustable locator is capable of rotating from a first position to a second position, the locator pin is disposed in a first location when the adjustable locator is in the first position, the locator pin is disposed in a second location when the adjustable locator is in the second position, and the first location of the locator pin is displaced a first distance in a first direction from the second location of the locator pin.

12. The locator assembly of claim 11 wherein each of the first track and the second track include a first rail, a second rail, and a series of ridges, the second rail is disposed opposite the first rail and the series of ridges are disposed connecting the first rail to the second rail.

13. The locator assembly of claim 11 wherein the locator pin of the adjustable locator further comprises a co-axial bore formed by at least one interior surface.

14. The locator assembly of claim 13 wherein the co-axial bore of the locator pin has a hexagonal cross-section.

15. The locator assembly of claim 11 wherein the adjustable locator further comprises a tab extending from an outer periphery of the first disc approximately opposite the first tooth.

16. The locator assembly of claim 15 wherein the bracket further comprises a first stop and a second stop, the first stop is disposed on the first surface of the bracket proximate a first end of the first track, the second stop is disposed on the first surface of the bracket proximate a second end of the first track.

17. The locator assembly of claim 16 wherein when the adjustable locator is rotated to the first position the tab is disposed in contact with the first stop of the bracket, when the adjustable locator is rotated to the second position the tab is disposed in contact with the second stop, the first distance is about 5 mm and the first direction is a vertical direction.

18. A method of assembling a first interior trim panel assembly to a door of a vehicle, the method comprising:
providing a locator assembly for a first interior trim panel of a vehicle, the locator assembly comprising a bracket disposed in the first interior trim panel; and an adjustable locator comprising a locator pin, and wherein the adjustable locator is rotatably supported by the bracket; and wherein the adjustable locator is capable of rotating from a first position to a second position, the locator pin is disposed in a first location when the adjustable locator is in the first position, the locator pin is disposed in a second location when the adjustable locator is in the second position, and the first location of the locator pin is displaced a first distance in a first direction from the second location of the locator pin;
providing a male clip attached to the first interior trim panel assembly;
hanging the first interior trim panel assembly on the door at a top edge of the first interior trim panel assembly;
swinging the first interior trim panel assembly onto the door forcing the male clip to engage with a female clip located on the door; and
adjusting the locator assembly of the first interior trim panel assembly.

19. The method of claim 18 further comprising visually checking the first interior trim panel assembly alignment with an adjacent second interior trim panel.

20. The method of claim 19 further comprising installing additional trim parts on the first interior trim panel assembly to cover the first locator assembly.

* * * * *